United States Patent Office 3,475,431
Patented Oct. 28, 1969

3,475,431
6-AMINOPHENYL-AND 6-ACYLAMINOPHENYL-4,5-DIHYDROPYRIDAZONES-(3)
Gerhard Bachmann and August Amann, Ludwigshafen (Rhine), Germany, assignors to Badische Anilin- & Soda-Fabrik Aktiengesellschaft, Ludwigshafen (Rhine), Germany
No Drawing. Filed Dec. 28, 1966, Ser. No. 605,213
Claims priority, application Germany, Oct. 19, 1966, B 89,433
Int. Cl. C07d 51/02
U.S. Cl. 260—250       4 Claims

ABSTRACT OF THE DISCLOSURE

New 6-aminophenyl-4,5-dihydropyridazones-(3) and 6-acylaminophenyl-4,5-dihydropyridazones-(3) having the Formula I:

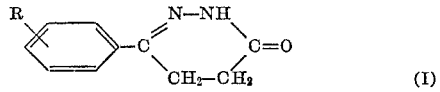

(I)

where R is an amino group or an acylamino group having from 2 to 12 carbon atoms, these compounds providing low-toxicity pharmaceuticals having anti-inflammatory action as well as prolonged blood-pressure reducing action.

---

We have found that compounds I can be obtained in conventional manner by reacting a compound of the Formula II:

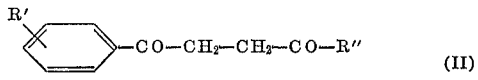

(II)

where R' is equal to R or is capable of conversion into R and R" is a hydroxyl group or an alkoxy group having 1 to 4 carbon atoms with hydrazine and if desired converting R' into R.

Examples of radicals R are particularly the amino group and aliphatic and aromatic acylamino groups. Examples of acyl radicals contained in the amino group are acetyl, propionyl, isobutyroyl, acryloyl, methacryloyl, propargyloyl, dodecanoyl, benzoyl, α-naphthyloyl and β-naphthyloyl groups as well as acyl radicals of polybasic carboxylic acids, particularly those having from 1 to 4 carbon atoms, e.g. the succinyl radicals

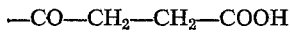

Other examples are cycloaliphatic acyl radicals having 5- to 7-membered rings, such as the hexahydrobenzoyl group, and araliphatic acyl radicals such as the phenylacetyl and the cinnamoyl group. The said groups may in turn bear chlorine atoms, hydroxyl groups, $C_1$ to $C_4$ alkoxy groups and carboxyl groups as substituents. Although all groups R in benzene radical may be in the ortho or meta position, they are preferably in the para position to the dihydropyridazonyl group.

The starting materials II necessary for the process are obtainable by conventional methods. Radicals capable of conversion into R are amino groups, which may be acylated prior to or after ring closure, or nitro groups which are reduced to amino groups, the latter being acylated if desired.

The reaction of compound II with hydrazine, hydrazine hydrate or salts of hydrazine which results in ring closure may be effected at temperatures of from 40 to 100° C. in the presence or absence of a solvent, the hydrazine or hydrate or salt thereof advantageously being allowed to act on II in a 5 to 20% excess. If R" is an alkoxy group, the corresponding alcohol is eliminated during the reaction in addition to water. If R' is not equal to R and first has to be converted into R and if desired nitrated, use may be made of the well-known reduction and acylation methods that need not be elaborated here.

The products according to this invention have antiinflammatory and blood pressure reducing action while exhibiting low toxicity.

EXAMPLES 0.5 mole portions of II in which R'=R and R"=—OH are suspended in from 100 to 300 ml. of water and the suspensions are reacted with 0.6 mole of hydrazine hydrate at approx. 90° C. during 1 to 3 hours. A clear solution is formed from which the product begins to crystallize out. The whole is allowed to cool and the precipitate consisting of I is separated.

The results are compiled in the following table:

| Example | R | Melting point of I (° C.) | Yield, percent |
|---|---|---|---|
| 1 | p-Amino | 236 | 94 |
| 2 | m-Amino | 169 | 95 |
| 3 | p-Acetylamino | 252 | 92 |
| 4 | m-Acetylamino | 208 | 84 |
| 5 | p-Benzoylamino | 302 | 90 |
| 6 | p-Propionylamino | 237 | 86 |
| 7 | m-Propionylamino | 191 | 85 |
| 8 | p-Succinylamino | 252 | 80 |
| 9 | m-Succinylamino | 192 | 78 |

Animal tests have shown the compounds to have antiinflammatory action and prolonged blood pressure reducing action.

We claim:
1. A compound of the formula

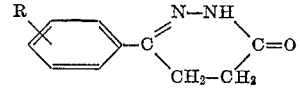

wherein R represents a substituent selected from the group consisting of —$NH_2$ and —NH-acyl with the acyl group containing from 2 to 12 carbon atoms.

2. A compound of the formula

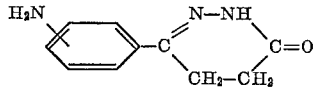

3. A compound of the formula

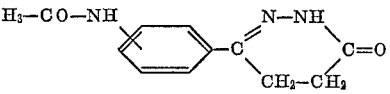

4. A compound of the formula

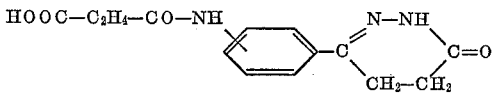

References Cited

UNITED STATES PATENTS 3,045,014   7/1962   Hensel et al.
3,193,552   7/1965   Dury et al.

NICHOLAS S. RIZZO, Primary Examiner

U.S. Cl. X.R.
260—999